(12) United States Patent
Robert (10) Patent No.: US 7,031,137 B2
(45) Date of Patent: Apr. 18, 2006

(54) VARIABLE MICRO-CAPACITOR WITH A HIGH RATIO AND A LOW OPERATING VOLTAGE

(75) Inventor: Philippe Robert, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 10/493,295

(22) PCT Filed: Oct. 23, 2002

(86) PCT No.: PCT/FR02/03631

§ 371 (c)(1),
(2), (4) Date: Apr. 25, 2004

(87) PCT Pub. No.: WO03/036668

PCT Pub. Date: May 1, 2003

(65) Prior Publication Data

US 2004/0257745 A1     Dec. 23, 2004

(30) Foreign Application Priority Data

Oct. 25, 2001   (FR)   ................................. 01 13796

(51) Int. Cl.
*H01G 7/00* (2006.01)
*H01G 7/04* (2006.01)
(52) U.S. Cl. ...................................... 361/281; 361/282
(58) Field of Classification Search ........ 361/280–282, 361/290, 299.1, 300, 277–278
See application file for complete search history.

(56) References Cited

U.S. PATENT DOCUMENTS 6,034,414 A    3/2000  Lin
6,229,684 B1 *  5/2001  Cowen et al. .............. 361/278

(Continued)

FOREIGN PATENT DOCUMENTS

DE        100 43 758       7/2001

(Continued)

OTHER PUBLICATIONS

Feng et al., "MEMS-based series and shunt variable capacitors for microwave and millimeter-wave frequencies", 2001, Sensors and Actuators, vol. A, No. 91, pp. 256-265.

(Continued)

*Primary Examiner*—Eric W. Thomas
(74) *Attorney, Agent, or Firm*—Thelen Reid & Priest LLP (57) ABSTRACT

A MEMS micro-capacitor having a variable capacity is disclosed. The MEMS micro-capacitor has at least one fixed electrode (3) positioned on one surface of a substrate (1); bending means with respect to the surface of the substrate including at least one moveable electrode (5) located opposite the fixed electrode (3); a layer of solid dielectric material interposed between the fixed electrode and the moveable electrode; and means (5, 6 and 7) for applying a bending force to the bending means. The bending force is intended to move the moveable electrode (5) with respect to the fixed electrode (3) in order to obtain, between these electrodes, a capacity that varies according to the applied bending force. The bending means are designed to clamp the layer of dielectric material between the moveable electrode and the fixed electrode so as to obtain a variable surface of the clamped layer of dielectric material.

19 Claims, 5 Drawing Sheets

U.S. PATENT DOCUMENTS

| | | | |
|---|---|---|---|
| 6,507,475 B1 * | 1/2003 | Sun | 361/281 |
| 2002/0135440 A1 * | 9/2002 | Ryhanen et al. | 333/185 |
| 2003/0099082 A1 | 5/2003 | Tuo et al. | |

FOREIGN PATENT DOCUMENTS

| | | |
|---|---|---|
| EP | 0 725 408 | 8/1996 |
| EP | 1 024 508 | 8/2000 |

OTHER PUBLICATIONS

International Search Report, PCT/FR02/03631, dated May 22, 2003.

* cited by examiner

VARIABLE MICRO-CAPACITOR WITH A HIGH RATIO AND A LOW OPERATING VOLTAGE

CROSS-REFERENCE TO RELATED APPLICATION

This application claims priority based on International Patent Application No. PCT/FR02/03631, entitled "Variable Micro-Capacitor With a High Ratio and a Low Operating Voltage" by ROBERT, Philippe, which claims priority of French application no. 01 13796, filed on Oct. 25, 2001, and which was not published in English.

The invention relates to a variable micro-capacitor, with a high ratio between maximum capacity and minimum capacity and with a low operating voltage.

The invention thus relates to the field of passive micro-components, MEMS (Micro-Electro-Mechanical-Systems) and radio-frequency.

STATE OF THE PRIOR TECHNIQUE

The variable micro-capacitors used in mobile telephones must meet the following specifications:

capacity variation range: ideally from 0.5 to 5 pF, that being a ratio between the maximum capacity and minimum capacity of 10;

supply voltage less than 5 V;

quality factor:

$$Q = \frac{1}{RC\omega}$$

greater than 30;

dimensions less than 0.05 mm$^2$;

capacity variation according to the control voltage as linear as possible.

In the field of microelectronics, the traditional variable micro-capacitors are made in silicon or in AsGa, by using either pn junction structures or Schottky type barrier junctions. These components have the inconvenience of a capacity variation range of less than 30% (ratio between maximum capacity and minimum capacity of 1.3), of high resistivity losses and consequently a poor quality factor (typically less than 10).

The MEMS variable micro-capacitors have, through their design and operating principle, a quality factor higher than the traditional variable micro-capacitors, typically greater than 30. They can be classified into two categories: those for which the capacity variation is due to an air gap variation and those for which the capacity variation is due to a surface variation.

The MEMS variable micro-capacitors with an air gap variation are described in the article "A Micromachine-Based Low Phase-Noise GHz Voltage-Controlled Oscillator for Wireless Communication" by Darrin J. Young et al., published in the Transducers'99, Jun. 7–10, 1999, Sendai, Japan, pages 1386–1389. These are the most widespread MEMS micro-capacitors. Such a system is composed of a fixed electrode, positioned on a substrate, and an electrode held by beams acting as a spring and positioned opposite the fixed electrode. The moving of the moveable electrode is performed according to the direction of the air gap. The air gap between the two electrodes can be adjusted by applying a potential difference, which provokes a capacity variation. This system allows to obtain dimensions of 200 μm ×200 μm (that being 0.04 mm$^2$) for a variation in capacity of 2.11 pF for a potential difference of zero between the electrodes to 2.46 pF for a potential difference of 5.5 V.

These micro-capacitors with variable air gap have the following inconveniences. Due to the non-linearity of the electrostatic forces, the air gap variation must be limited to one third of the initial air gap to prevent the moveable electrode from sticking to the fixed electrode. We thus theoretically achieve a capacity variation limited to 50%. To resolve this problem whilst maintaining the same operating principle, a thermal operating can be envisaged as is proposed in the article "The realisation and design considerations of a flip-chip integrated MEMS tunable capacitor" by Kevin F. Harsh et al., published in Sensors and Actuators 80 (2000), pages 108–118. However, this type of operating leads, for most applications, to excessive consumption. Another inconvenience of these micro-capacitors with variable air gap is that the variation capacity is not linear in relation to the control voltage. Moreover, this type of component is sensitive to accelerations (unstable capacity according to accelerations).

The MEMS variable micro-capacitors with a variable surface are based on the use of an interdigital comb micro actuator. The electrostatic actuator is used to move a comb structure and thus adjust the surface covering of each of the fingers constituting the micro-capacitor.

These micro-capacitors have the following inconveniences. Their operating voltage is high. It usually lies between 80 and 200 V. Regarding this subject, we can refer to the article "RF MEMS from a device perspective" by J. Jason Yao, published in J. Micromech. Microeng. 10 (2000) R9–R38. The component surface is large, typically reaching about 1 mm$^2$. The capacity values are low (approximately 30 to 100 fF). Additionally, these components are also sensitive to accelerations and shocks.

SUMMARY OF THE INVENTION

The MEMS variable capacitor according to the invention allows to resolve the inconveniences of the prior art. The proposed structure is comparable to variable air gap capacitors (membrane or beam suspended above a fixed electrode), but radically differs by its operating mode. Indeed, whilst for the capacitors of the known art, the sticking of the moveable electrode to the fixed electrode is avoided, in the case of the invention a localised sticking is provoked with the placing of a dielectric layer composed of a solid dielectric material with the possibility of no material on certain zones. It is therefore the sticking surface which, according to the control voltage, determines the capacity variation.

The object of the invention if therefore a MEMS variable micro-capacitor of variable air gap type, comprising:

at least one fixed electrode positioned on one surface of a substrate;

at least one deformable electrode positioned opposite the fixed electrode;

means forming a solid dielectric layer placed between the fixed electrode and the deformable electrode;

sagging means with respect to said substrate surface, comprising said deformable electrode and designed to clasp the means forming a dielectric layer between the deformable electrode and the fixed electrode so as to obtain a surface of clasped means forming a dielectric layer variable according to the applied sagging force;

means for applying a sagging force to said sagging means, intended to move the deformable electrode with respect to the fixed electrode to obtain between these electrodes a variable capacity depending on the applied sagging force, characterised in that the means for applying a sagging force comprises first means to obtain a surface of means forming a clasped dielectric layer corresponding to a first capacity value and second means to obtain a surface of means forming a clasped dielectric layer corresponding to a second capacity value.

The sagging means can be chosen from among a membrane, a beam fixed at one of its ends or a beam fixed at both of its ends.

The means forming a dielectric layer can be chosen among a layer of continuous dielectric material, a layer of dielectric material with holes and a set of elements separated from each other. These elements can comprise a contact stud and/or bands.

The means forming a dielectric layer can be integral to the fixed electrode and/or the deformable electrode.

Advantageously, the substrate is a wafer of silicon covered in a layer of silicon dioxide. The means forming a dielectric layer can be in $Si_3N_4$, $SiO_2$ or in TaON.

The sagging means can also be envisaged to clasp a part of the means forming a dielectric layer between the deformable electrode and the fixed electrode prior to the applying of a sagging force.

The means of applying a sagging force can be chosen among electrostatic means, electromagnetic means, thermal means and piezoelectric means or from a combination of these means. The means of applying a sagging force can comprise thermal means acting through a bimetal effect. These thermal means can comprise at least one heating resistor positioned on the sagging means.

The deformable electrode can constitute the sagging means.

If the means of applying a sagging force comprise electrostatic means, the first means to obtain a surface of clasped means forming a dielectric layer corresponding to a first capacity value can be comprised of electrodes applying an electric field, the second means to obtain a surface of clasped means forming a dielectric layer corresponding to a second capacity value being comprised of electrodes applying an electric field.

Advantageously, said fixed electrode and/or deformable electrode have a configuration allowing to obtain a linear variation of capacity according to the means of applying the sagging force. Said configuration can consist in giving an electrode, chosen among the fixed electrode and the deformable electrode, a limited width at the zone where the fixed electrode and the deformable electrode are firstly at their closest, the width of this electrode increasing as it retracts from this zone. The other electrode among the fixed electrode and the deformable electrode being of a constant width. If the means of applying a sagging force comprise electrostatic means, these electrostatic means can comprise at least one electrode positioned in a space left free by the configuration given to said electrode.

The sagging means can be of multilayer type.

Another object of the invention is a method for obtaining a variable capacity between a fixed electrode and a deformable electrode positioned opposite the fixed electrode, means forming a solid dielectric layer being placed between the fixed electrode and the deformable electrode, characterised in that it comprises the following steps:

clasping a first surface of means forming a dielectric layer between the fixed electrode and the deformable electrode, via distortion of the deformable electrode, to obtain a first capacity value;

clasping a second surface of means forming a dielectric layer between the fixed electrode and the deformable electrode, via distortion of the deformable electrode, to obtain a second capacity value.

Advantageously, the distorting of the deformable electrode is obtained via an effect chosen among the electrostatic, electromagnetic, thermal or piezoelectric effects or from a combination of these effects.

BRIEF DESCRIPTION OF THE DRAWINGS

The invention will be better understood and other advantages and particularities will appear upon reading the description which follows, given by way of non-restrictive example, accompanied with annexed drawings among which.

DETAILED DESCRIPTION OF EMBODIMENTS OF THE INVENTION

Figure 1A:
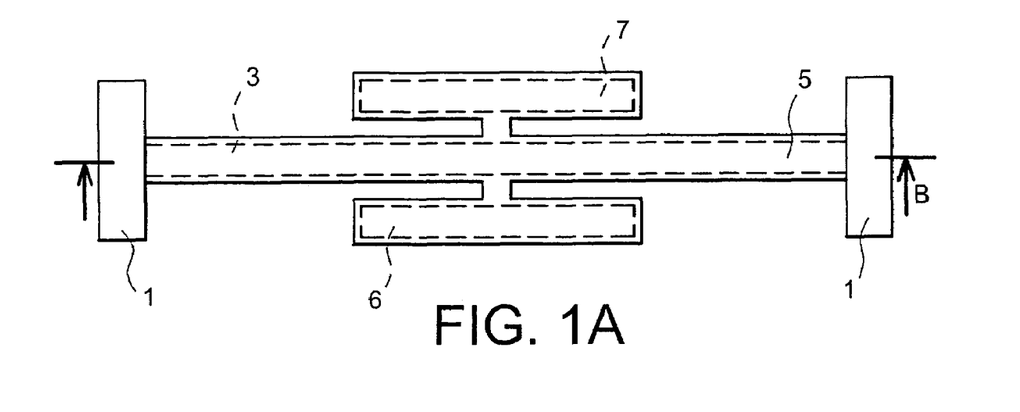
FIG. 1A is a skeletal top view of a first alternative of the variable micro-capacitor according to the invention.
Figure 1B:
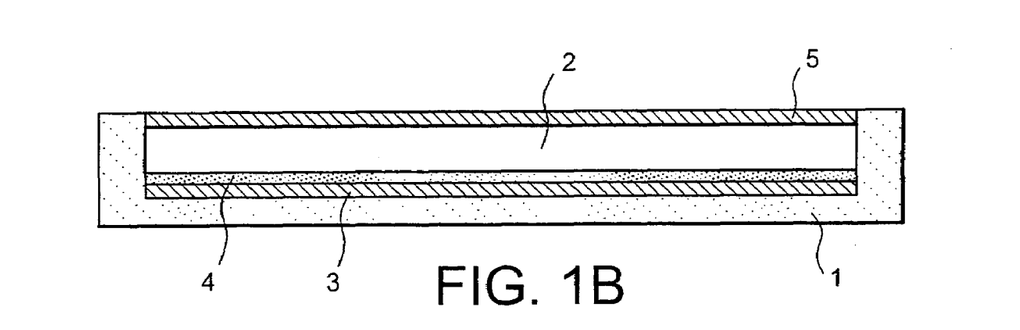
FIG. 1B is a longitudinal cross-section view, according to the axis BB, of the variable micro-capacitor in FIG. 1A.

A first alternative of the variable micro-capacitor according to the invention is illustrated in FIGS. 1A (top view) and 1B (longitudinal cross-section view). The micro-capacitor is made on one insulating surface of a substrate 1 on which a recess 2 is made. It comprises a fixed or inside electrode 3 positioned at the bottom of the recess. A layer of dielectric material 4 is applied to the fixed electrode 3. Above and at a certain distance from the layer of dielectric material 4 a deformable or upper electrode 5 is placed fixed at both its ends to substrate 1. The electrode 5 comprises a central part positioned opposite the fixed electrode 3 and two lateral parts positioned on either side of the central part. The layer of dielectric material 4 allows to avoid any short-circuiting between the deformable electrode 5 and the fixed electrode 3. It ensures the capacitive function of the micro-capacitor.

Two other electrodes, referenced 6 and 7, are positioned at the bottom of the recess 2, and on either side of the fixed electrode 3. The electrodes 6 and 7 are each positioned opposite one of the lateral parts of the deformable electrode 5. The electrodes 6 and 7 and the lateral parts of the deformable electrode 5 are used to apply an electrostatic attractive force intended to bring the central part of the electrode 5 closer to the fixed electrode 3 until it touches the layer of dielectric material 4.

Figure 2:
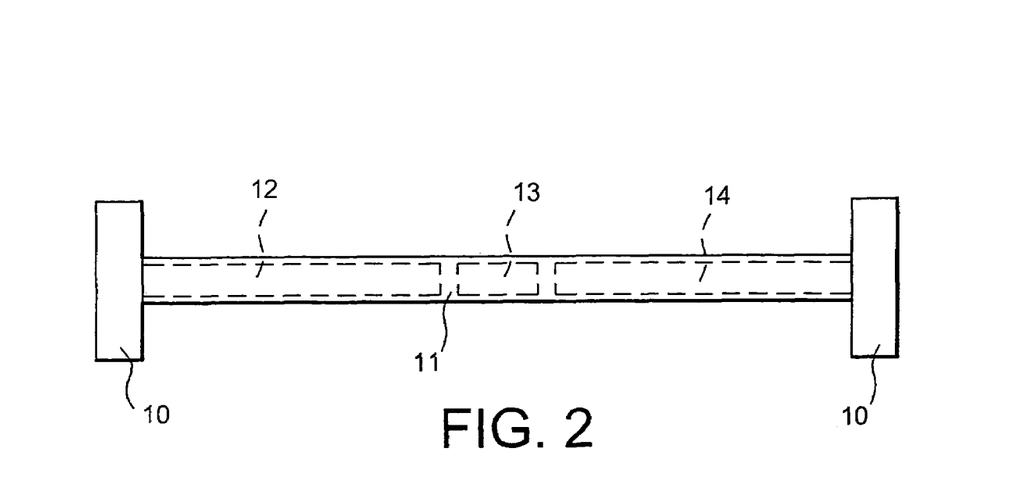
FIG. 2 is a skeletal top view of a second alternative of the variable micro-capacitor according to the invention.

FIG. 2 represents a top view of a second alternative of the variable micro-capacitor according to the invention. This alternative allows to avoid the presence of electrodes or electrode parts that overshoot laterally. The deformable electrode 11 is fixed at both its ends to the substrate 10 as aforementioned. It is composed of a simple band. At the bottom of the recess and opposite the deformable electrode 11 are positioned three aligned electrodes, the electrodes 12, 13 and 14. The electrode 13 is in a central position and is used, jointly with the deformable electrode 11, to apply an electrostatic attraction force intended to bring the central part of the electrode 11 closer to the bottom of the recess. We thus obtain variable micro-capacitors between, on one hand, the deformable electrode 11 and the fixed electrode 12 and, on the other hand, between the deformable electrode 11 and the fixed electrode 14. A single variable micro-capacitor can be obtained by linking the electrodes 12 and 14 together.

Between the deformable electrode 11 and the fixed electrodes 12, 13 and 14 is placed a layer of dielectric material (not represented in FIG. 2). This layer of dielectric material can be applied to the fixed electrodes and/or the deformable electrode.

As an alternative, the lower electrode can be composed of a single band and the three aligned electrodes positioned opposite the lower electrode. In this case, these three electrodes are positioned for example on the lower surface of a beam or membrane.

Figure 3A:
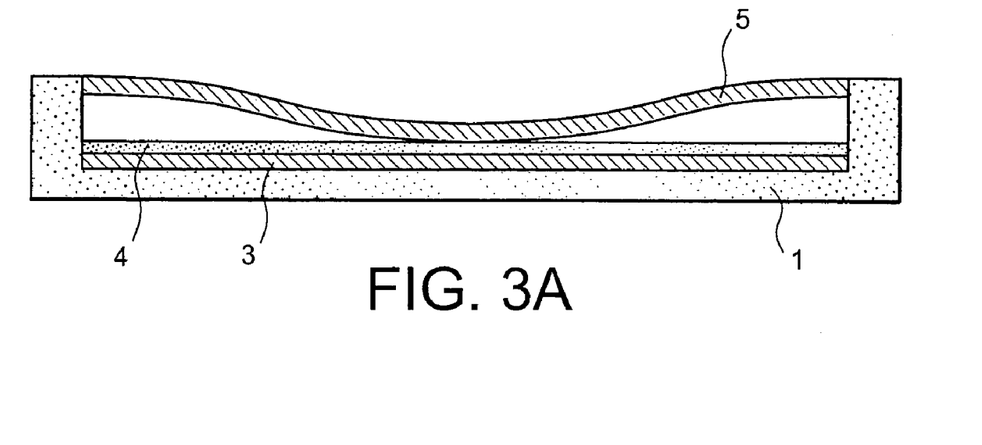
FIGS. 3A and 3B are longitudinal cross-section views showing the operating of a variable micro-capacitor according to the invention.
Figure 3B:
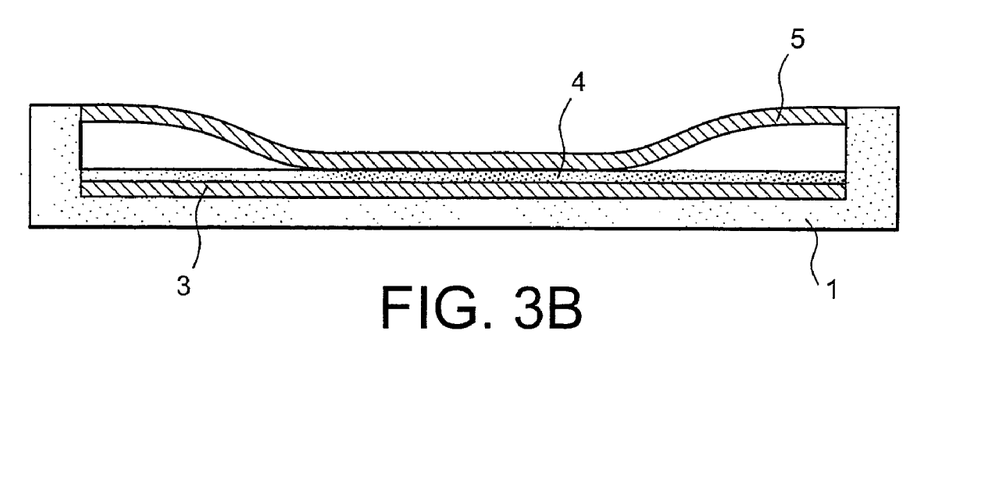

FIGS. 3A and 3B illustrate the operating of a variable micro-capacitor according to the invention, for example the one represented in FIGS. 1A and 1B.

When there is no potential difference between the electrodes, the micro-capacitor is in the state represented in FIG. 1B. When operating, an appropriate continuous voltage $V_1$ is applied between the electrodes 6 and 7 on one hand and 5 on the other hand (see FIG. 1A). This generates an electrostatic attractive force which presses the central part of the deformable electrode 5 against the layer of dielectric material 4. We thus obtain, between the deformable electrode 5 and the fixed electrode 3, an initial capacity $C_0$ (see FIG. 3A).

Applying an appropriate continuous voltage $V_2$ between the deformable electrode 5 and the fixed electrode 3 increases the electrostatic attractive force and further presses the deformable electrode 5 against the layer of dielectric material 4. We thus obtain, between the deformable electrode 5 and the fixed electrode 3, a capacity $C > C_0$.

There is a relation which links the capacity C to the voltage $V_2$. This relation is determined by the profile and the layout of the electrodes of the micro-capacitor.

The putting into contact of the deformable electrode with the layer of dielectric material to obtain an initial capacity value can be otherwise obtained via electrostatic forces. This effect can be obtained thanks to electrostatic forces, thermal forces (by means of a bimetal) or piezoelectric forces.

Figure 4:
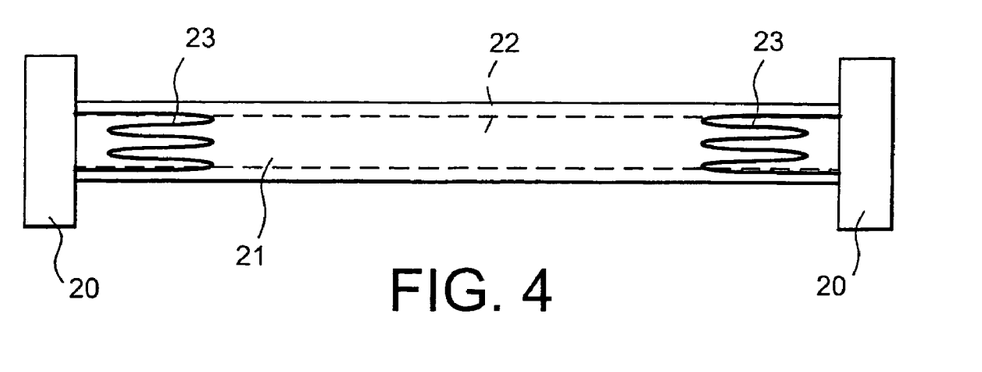
FIG. 4 is a skeletal top view of a third alternative of the variable micro-capacitor according to the invention.

FIG. 4 illustrates another alternative of the variable micro-capacitor where the initial capacity results from the action of a thermal bimetal assisted by the applying of electrostatic forces. In this top view, the reference 20 designates the substrate, the reference 21 designates the deformable electrode forming a beam fixed at both its ends and the reference 21 designates the fixed electrode positioned at the bottom of the recess. The layer of dielectric material is not represented.

The heating resistors 23 are positioned on the deformable electrode 21 near its ends. The passing of a current in the heating resistors 23 leads to a localised rise in temperature and a bimetal effect which provokes the distortion of the deformable electrode 21 to bring it into contact with the layer of dielectric material. Once the deformable electrode makes contact, its distorted position can be maintained solely by electrostatic forces by using electrodes 21 and 22. This allows to avoid an excessive consumption of the component. This electrostatic force can possibly be associated with the bimetal effect during the distortion and putting into contact stage.

The invention combines several particularly interesting advantages. A first advantage consists in the amplitude of the capacity variation. This amplitude is very important, typically from 0.5 to 5 pF. This result is explained in that when a beam is partially stuck a very small variation of sticking surface is sufficient to substantially modify the capacity of the micro-capacitor. Indeed, the capacity is expressed as:

$$C = \varepsilon_0 \cdot \varepsilon_r \cdot \frac{S}{d}$$

with $\varepsilon_0$ the electric constant, $\varepsilon_r$ the dielectric constant of the insulant, S the sticking surface and d the thickness of the insulant.

In the case of MEMS micro-capacitors in the state of the art, the insulant is air ($\varepsilon_r$ therefore equals 1) and d generally lies between 0.5 and 2 μm. In the case of micro-capacitors according to the invention, the capacity is principally defined by the stuck zone, that is the zone where $\varepsilon_r = 7.5$ in the case of silicon nitride and where d is close to 0.15 μm. It is therefore clear that the effect of an increase in the sticking surface on the capacity is greatly accentuated by the high value of $\varepsilon_r$ and the low value of d.

A second advantage results from the low value of the operating voltage of the device (less than or equal to 3 V). In this matter we notice that the sticking of the deformable electrode allows to greatly reduce the maintaining voltage of the distorted beam. Calculations demonstrate for example that in the case of a beam where 10 or so volts are necessary to stick the deformable electrode, less than 2 volts then suffice to hold it in the distorted position.

A third advantage results from the good stability of the obtained capacity. Indeed, the capacity value is essentially defined by the sticking of the deformable electrode to the insulant. In this zone, the air gap is fixed and independent from any external disruption (vibrations, shocks, temperature . . . ) which renders the capacity perfectly stable throughout time.

A fourth advantage is that the making of the micro-capacitor is compatible with the methods of manufacturing integrated circuits.

A fifth advantage comes from the small dimensions of the obtained component, typically 350 μm×50 μm, that being less than 0.02 mm².

A sixth advantage is that the law of capacity variation according to the applied voltage is adjustable by simply redefining the electrodes. This can be demonstrated by the structure in FIG. 5.

Figure 5:
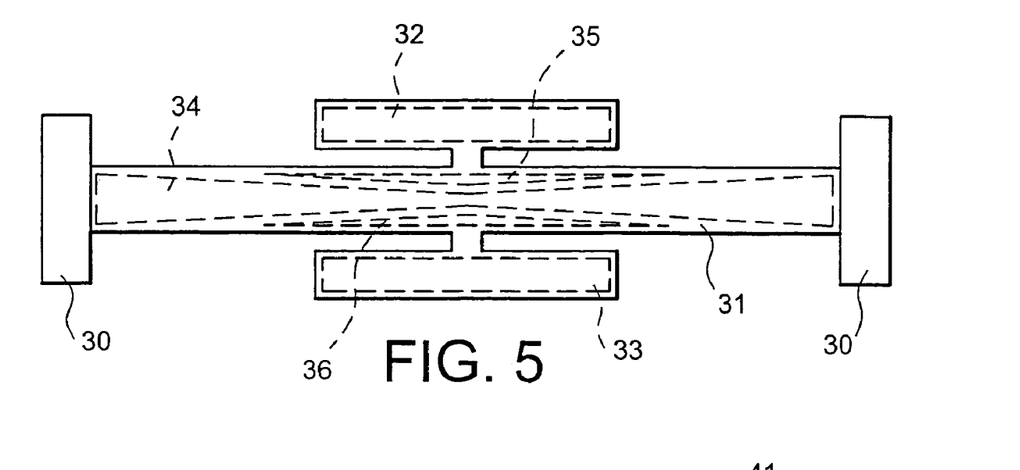
FIG. 5 is a skeletal top view of a fourth alternative of the variable micro-capacitor according to the invention.

FIG. 5 illustrates a micro-capacitor made from a substrate 30. The substrate 30 supports, above a recess, the ends of a deformable electrode 31 constituting a beam. The deformable electrode 31 comprises, as in the device in FIG. 1A, a central part and two lateral parts. At the bottom of the recess are fixed five electrodes: the electrodes 32 and 33 each positioned opposite one of the lateral parts of the electrode 31 and the electrodes 34, 35 and 36 positioned opposite the deformable electrode 31. A layer of dielectric material, not represented, is placed between the deformable electrode 31 and the electrodes 32 to 36. This layer of dielectric material is for example applied to the electrodes 32 to 36. The electrodes 32 and 33 are used to put the deformable electrode 31 into contact with the layer of dielectric material to obtain an initial capacity value. The electrodes 35 and 36 are used to operate the deformable electrode 31 with the aim of obtaining a desired capacity value. The electrode 34 is also used to operate the deformable electrode 31. It is further used to define the useful capacity of the micro-capacitor.

The dished shape given to the fixed electrode 34, whose width is at its least at the centre of the device, and the presence of operating electrodes 35 and 36 in the zone left free by the shrinking of the electrode 34 allows to "linearise" the capacity variation according to the control voltage of useful capacity.

FIGS. 6A to 6E illustrate a method of making a micro-capacitor according to the invention.

Figure 6A:
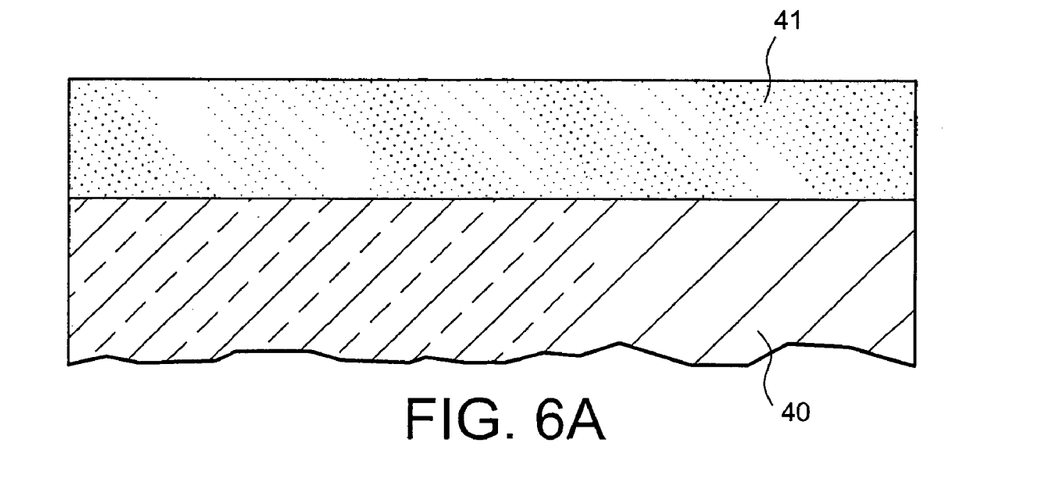
FIGS. 6A to 6E are longitudinal cross-section views showing the making of a variable micro-capacitor according to the invention from a silicon substrate.

FIG. 6A shows a substrate 40 in silicon on which we grew, via oxidation, a 3 µm thick layer 41 of silicon dioxide.

Figure 6B:
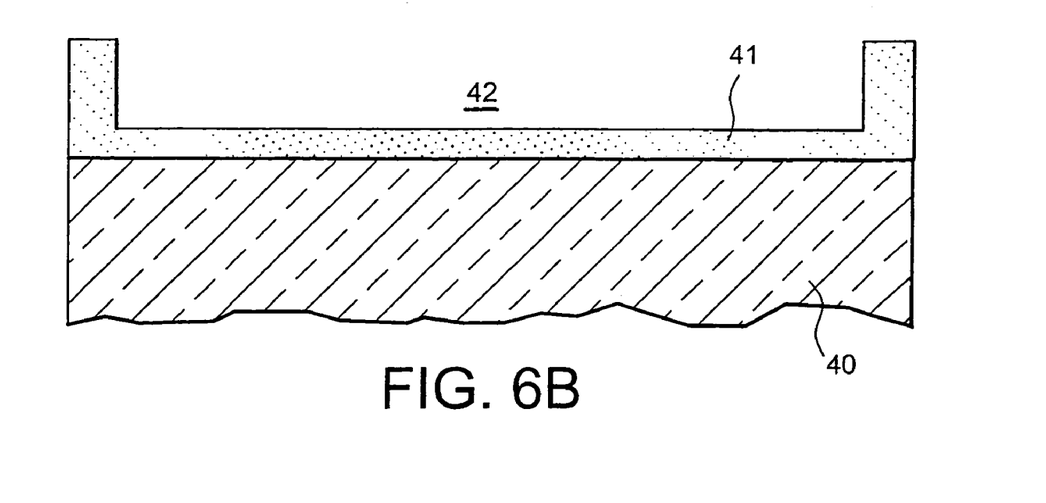

Via lithography and engraving, a 2 µm deep recess 42 is created in the oxide layer 41 (see FIG. 6B).

Figure 6C:
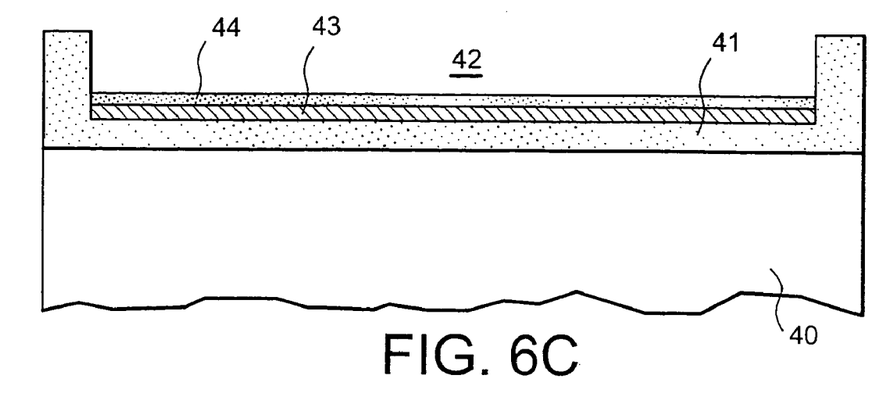

At the bottom of the recess 42, we apply a 1 µm thick layer of gold 43 (see FIG. 6C). Via lithography and engraving, the fixed electrode(s) are defined from this layer 43. A 150 nm thick layer of silicon nitride 44 is applied to the fixed electrode(s).

Figure 6D:
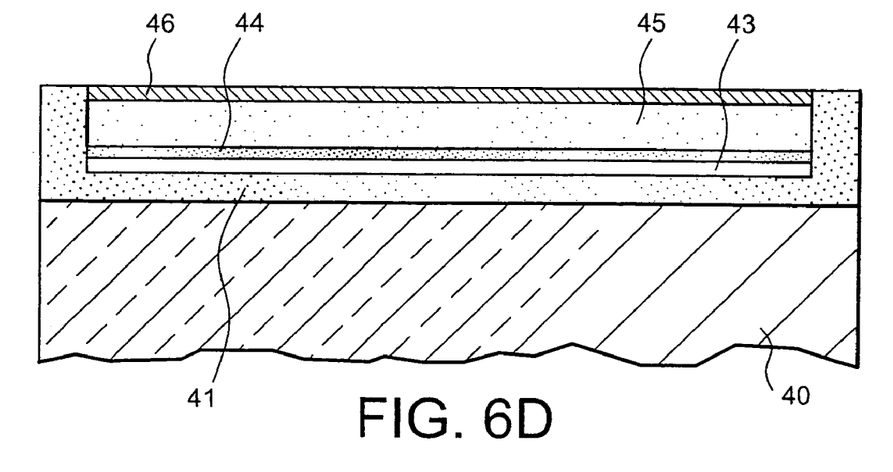

FIG. 6D shows that the recess was filled in by a sacrificial bed 45 of polymer, 1.5 µm thick for example. The sacrificial bed 45 is made plane and a 2 µm thick layer of aluminium 46 is applied to the planed out sacrificial bed 45. Via lithography, we determine the shape to be given to the deformable electrode intended to constitute a beam. The layer of aluminium 46 is then engraved to supply the desired electrode.

Figure 6E:
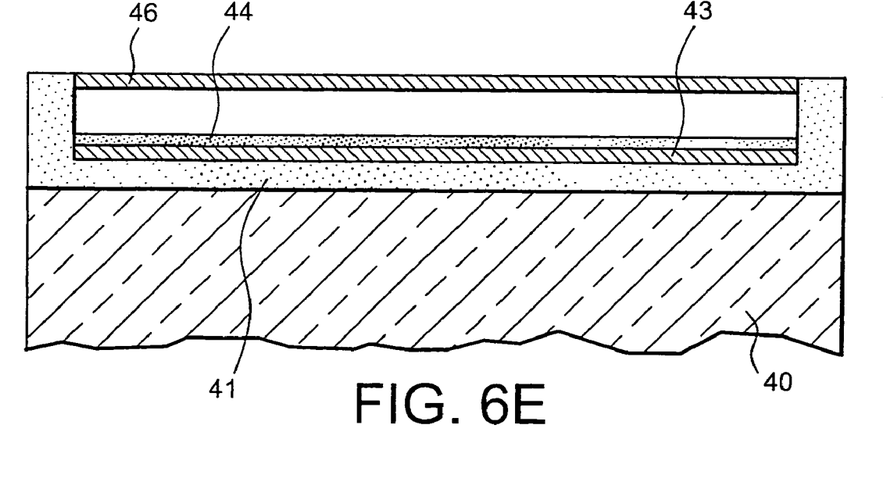

The sacrificial bed is then eliminated as shown in FIG. 6E and the beam (that is the deformable electrode) made in the layer of aluminium 46 is freed.

Figure 7:
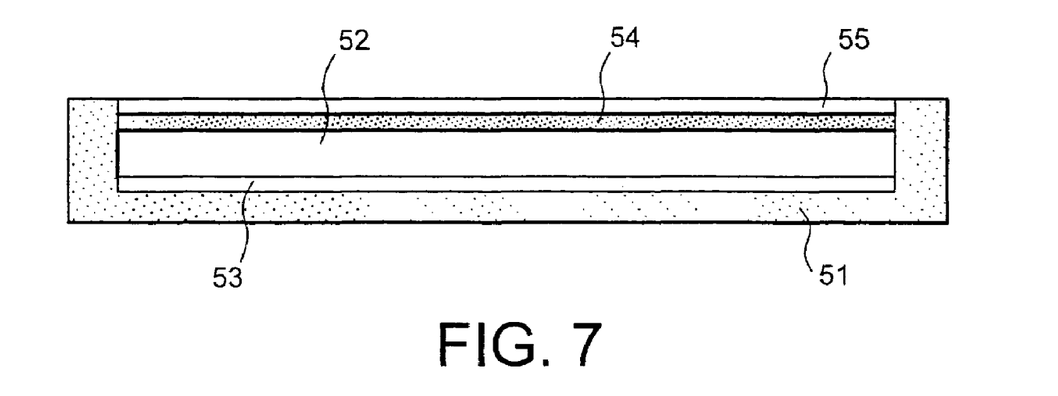
FIG. 7 is a longitudinal cross-section view of another variable micro-capacitor according to the invention.

FIG. 7 is a longitudinal cross-section view of another variable micro-capacitor according to the invention in an unenergised condition. The micro-capacitor is made on one surface of a substrate 51 from which a recess 52 is made. It comprises a fixed electrode or lower electrode 53 positioned at the bottom of the recess. A deformable or upper electrode 55 is fixed at both its ends to the substrate 51. The deformable electrode 55 supports, on its inside surface to the structure, a layer of dielectric material 54.

The distorted part of the micro-capacitor can also be constituted of a multilayer comprising a layer of dielectric material on the inside of the structure (for example in $Si_3N_4$) forming dielectric for the micro-capacitor, a conductive layer (for example in gold) forming the deformable electrode and a layer of covering (for example in $SiO_2$) on the outside of the structure.

Figure 8:
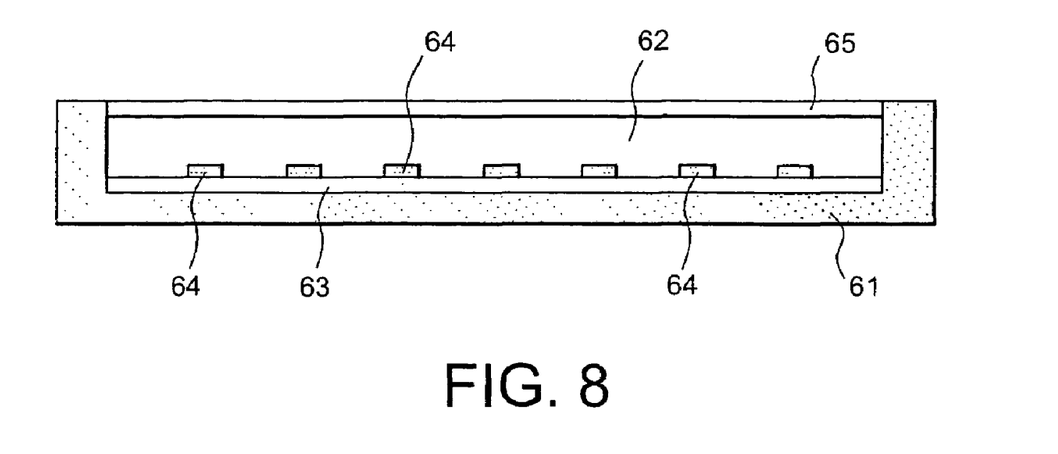
FIG. 8 is a longitudinal cross-section view of yet another variable micro-capacitor according to the invention.

FIG. 8 is a longitudinal cross-section view of yet another variable micro-capacitor according to the invention in an unenergised condition. It is made on one insulant surface of a substrate 61 from which a recess 62 is made. It comprises a fixed electrode or lower electrode 63 positioned at the bottom of the recess. A deformable or upper electrode 65 is fixed at both its ends to the substrate 61. The fixed electrode 63 supports a certain number of elements 64 in dielectric material, for example in $Si_3N_4$. These elements 64 can be contact studs in various shapes or bands also in various shapes. They are particularly used to avoid short-circuiting between the electrodes 63 and 65. They constitute along with the gas which surround them (for example air) the dielectric of the variable micro-capacitor. They can be obtained by first applying a continuous layer of dielectric material, then by hiding and engraving this layer.

As for the micro-capacitor in FIG. 7, the elements in dielectric material can be fixed on the inside surface of the deformable electrode to the structure.

The presence of dielectric elements in replacement for a continuous layer has the advantage of limiting the risks of sticking the deformable electrode to the bottom of the recess, this sticking can be due to a phenomenon of entrapment of loads in the dielectric material or to the surface effects.

The variable micro-capacitor according to the invention has applications in all variable capacity components. We can cite RLC type filters, LN parametric amplifier, tone generators, frequency monitors.

The invention claimed is:

1. A MEMS micro-capacitor of variable capacity of variable air gap type, comprising:
   at least one fixed electrode positioned on one surface of a substrate;
   at least one deformable electrode positioned opposite the fixed electrode;
   means forming a solid dielectric layer placed between the at least one fixed electrode and the at least one deformable electrode;
   sagging means with respect to said substrate surface, comprising said at least one deformable electrode and designed to clasp the means forming a dielectric layer between the at least one deformable electrode and the at least one fixed electrode so as to obtain a surface of clasped means forming a dielectric layer;
   means for applying a sagging force to said sagging means, intended to move the at least one deformable electrode with respect to the at least one fixed electrode to obtain between these electrodes a variable capacity depending on the applied sagging force,
   wherein the means for applying a sagging force comprises first means to obtain a surface of clasped means forming a dielectric layer corresponding to a first capacity value and second means to obtain a surface of clasped means forming a dielectric layer corresponding to a second capacity value.

2. The micro-capacitor as claimed in claim 1, wherein the sagging means are chosen from among a membrane, a beam fixed at one of its ends or a beam fixed at both of its ends.

3. The micro-capacitor as claimed in claim 1, wherein the means forming a dielectric layer are chosen among a layer of continuous dielectric material, a layer of dielectric material with holes and a set of elements separated from each other.

4. The micro-capacitor as claimed in claim 3, wherein the elements comprise at least one of contact studs and bands.

5. The micro-capacitor as claimed in claim 1, wherein the means forming a dielectric layer are integral to at least one of the at least one fixed electrode and the at least one deformable electrode.

6. The micro-capacitor as claimed in claim 1, wherein the substrate is a wafer of silicon covered in a layer of silicon dioxide.

7. The micro-capacitor as claimed in claim 6, wherein the means forming a dielectric layer are in $Si_3N_4$, $SiO_2$ or in TaON.

8. The micro-capacitor as claimed in claim 1, wherein the sagging means are envisaged to clasp a part of the means forming a dielectric layer between the at least one deformable electrode and the at least one fixed electrode prior to the applying of a sagging force.

9. The micro-capacitor as claimed in claim 1, wherein the means for applying a sagging force are chosen among electrostatic means, electromagnetic means, thermal means and piezoelectric means or from a combination of these means.

10. The micro-capacitor as claimed in claim 9, wherein the means for applying a sagging force comprises thermal means acting through a bimetal effect.

11. The micro-capacitor as claimed in claim 10, wherein the thermal means comprises at least one heating resistor positioned on the sagging means.

12. The micro-capacitor as claimed in claim 1, wherein the at least one deformable electrode constitutes the sagging means.

13. The micro-capacitor as claimed in claim 1, wherein the means for applying a sagging force comprises electrostatic means, the first means to obtain a surface of clasped means forming a dielectric layer corresponding to a first capacity value are comprised of electrodes applying an electric field, the second means to obtain a surface of clasped means forming a dielectric layer corresponding to a second capacity value being comprised of electrodes applying an electric field.

14. The micro-capacitor as claimed in claim 1, wherein at least one of said at least one fixed electrode and said at least one deformable electrode have a configuration allowing to obtain a linear variation of capacity according to the means for applying the sagging force.

15. The micro-capacitor as claimed in claim 14, wherein said configuration consists in giving an electrode, chosen among the at least one fixed electrode and the at least one deformable electrode, a limited width at the zone where the at least one fixed electrode and the at least one deformable electrode are firstly at their closest, the width of this electrode increasing as it retracts from this zone, the other electrode among the at least one fixed electrode and the at least one deformable electrode being of a constant width.

16. The micro-capacitor as claimed in claim 15, wherein the means for applying a sagging force comprising electrostatic means, these electrostatic means comprises at least one electrode positioned in a space left free by the configuration given to said electrode.

17. The micro-capacitor as claimed in claims 1, wherein the sagging means are of multilayer type.

18. A method for obtaining a variable capacity between a fixed electrode and a deformable electrode positioned opposite the fixed electrode, means forming a solid dielectric layer being placed between the fixed electrode and the deformable electrode, wherein it comprises the following steps:
    clasping a first surface of means forming a dielectric layer between the fixed electrode and the deformable electrode, via distortion of the deformable electrode, to obtain a first capacity value;
    clasping a second surface of means forming a dielectric layer between the fixed electrode and the deformable electrode, via distortion of the deformable electrode, to obtain a second capacity value.

19. The method as claimed in claim 18, wherein the deformation of the deformable electrode is obtained via an effect chosen among the electrostatic, electromagnetic, thermal or piezoelectric effects or from a combination of these effects.

* * * * *